US012605900B2

(12) United States Patent
Garrido Barrabes et al.

(10) Patent No.: US 12,605,900 B2
(45) Date of Patent: Apr. 21, 2026

(54) EXTRACTION SYSTEM FOR APPARATUS FOR THE LAYER-BY-LAYER FORMATION OF THREE-DIMENSIONAL OBJECTS, AND ASSOCIATED METHODS AND CONTROLLER

(71) Applicant: Stratasys Powder Production Ltd., London (GB)

(72) Inventors: Marcel Garrido Barrabes, London (GB); Anders Hartmann, London (GB)

(73) Assignee: Stratasys Powder Production Ltd., Nottingham (GB)

( * ) Notice: Subject to any disclaimer, the term of this patent is extended or adjusted under 35 U.S.C. 154(b) by 351 days.

(21) Appl. No.: 17/916,026

(22) PCT Filed: Mar. 29, 2021

(86) PCT No.: PCT/GB2021/050773

§ 371 (c)(1),
(2) Date: Sep. 29, 2022

(87) PCT Pub. No.: WO2021/198667

PCT Pub. Date: Oct. 7, 2021

(65) Prior Publication Data

US 2023/0142837 A1 May 11, 2023

(30) Foreign Application Priority Data

Apr. 2, 2020 (GB) ...................................... 2004906

(51) Int. Cl.
B29C 64/364 (2017.01)
B08B 15/00 (2006.01)
(Continued)

(52) U.S. Cl.
CPC ............ B29C 64/364 (2017.08); B08B 15/00 (2013.01); B29C 64/135 (2017.08);
(Continued)

(58) Field of Classification Search
CPC ........ B29C 64/364; B33Y 40/00; B22F 12/70
See application file for complete search history.

(56) References Cited

U.S. PATENT DOCUMENTS

| | | | | | |
|---|---|---|---|---|---|
| 5,626,820 A | * | 5/1997 | Kinkead | ................. | F24F 3/167 |
| | | | | | 55/318 |
| 5,711,705 A | | 1/1998 | Krainiak et al. | | |

(Continued)

FOREIGN PATENT DOCUMENTS

| | | |
|---|---|---|
| CN | 104353832 B | 2/2015 |
| CN | 105642891 B | 6/2016 |

(Continued)

*Primary Examiner* — Alison L Hindenlang
*Assistant Examiner* — Andres E. Behrens, Jr.
(74) *Attorney, Agent, or Firm* — Honigman LLP; Eric J. Sosenko; Jonathan P. O'Brien

(57) ABSTRACT

An apparatus for the layer-by-layer formation of three-dimensional objects, the apparatus comprising a gas extraction system and an enclosed working space from which gas is to be extracted, wherein the working space is enclosed by side walls, a ceiling and a working surface, and comprises a working space inlet for allowing gas to enter into the working space, a working space outlet for allowing gas to exit the working space, and a build bed surface in which a layer of the object is formed; wherein the gas extraction system comprises: a primary conduit comprising at least a first primary inlet, at least a first interfacing inlet, and a primary outlet; and at least a first secondary conduit comprising a respective first secondary inlet and a respective first secondary outlet, the first secondary inlet being in fluidic communication with the working space for extracting gas from the working space, and the first secondary outlet being (Continued)

in fluidic communication with the first interfacing inlet; wherein the or each primary inlet is open to an environment external to the working space, and wherein the primary outlet is connectable to an external extraction source so as to suction gas from the primary conduit; and wherein the gas extraction system further comprises one or more flow control devices for controlling the flow of gas from the working space into the first secondary conduit, and thence into the primary outlet of the primary conduit. Methods for operating the apparatus, and a controller for controlling the apparatus and carrying out the methods, are also provided.

5 Claims, 8 Drawing Sheets

(51) Int. Cl.

| | |
|---|---|
| *B29C 64/00* | (2017.01) |
| *B29C 64/135* | (2017.01) |
| *B29C 64/393* | (2017.01) |
| *B33Y 30/00* | (2015.01) |
| *B33Y 40/00* | (2020.01) |
| *B33Y 50/00* | (2015.01) |
| *B22F 3/105* | (2006.01) |
| *B22F 10/10* | (2021.01) |
| *B22F 10/322* | (2021.01) |
| *B22F 10/368* | (2021.01) |
| *B22F 12/00* | (2021.01) |
| *B22F 12/70* | (2021.01) |
| *B22F 12/90* | (2021.01) |
| *B33Y 50/02* | (2015.01) |
| *B33Y 70/00* | (2020.01) |
| *B33Y 80/00* | (2015.01) |

(52) U.S. Cl.
CPC ............ *B29C 64/393* (2017.08); *B33Y 40/00* (2014.12); *B22F 3/105* (2013.01); *B22F 10/10* (2021.01); *B22F 10/322* (2021.01); *B22F 10/368* (2021.01); *B22F 12/00* (2021.01); *B22F 12/70* (2021.01); *B22F 12/90* (2021.01); *B29C 64/00* (2017.08); *B33Y 30/00* (2014.12); *B33Y 50/00* (2014.12); *B33Y 50/02* (2014.12); *B33Y 70/00* (2014.12); *B33Y 80/00* (2014.12); *Y02P 10/00* (2015.11); *Y02P 10/25* (2015.11)

(56) References Cited

U.S. PATENT DOCUMENTS

| | | | | |
|---|---|---|---|---|
| 11,292,063 | B2 * | 4/2022 | Shaw | B22F 12/80 |
| 11,760,024 | B2 * | 9/2023 | Schödel | B22F 10/322 |
| | | | | 425/78 |
| 2004/0003741 | A1 * | 1/2004 | Iskra | B22F 12/70 |
| | | | | 427/372.2 |
| 2004/0004303 | A1 * | 1/2004 | Iskra | B33Y 10/00 |
| | | | | 425/375 |
| 2004/0005182 | A1 * | 1/2004 | Gaylo | B22F 12/226 |
| | | | | 400/283 |
| 2004/0012112 | A1 * | 1/2004 | Davidson | B33Y 40/00 |
| | | | | 264/109 |
| 2004/0084814 | A1 * | 5/2004 | Boyd | B29C 64/35 |
| | | | | 264/109 |
| 2007/0021050 | A1 * | 1/2007 | Kennedy | F24F 3/167 |
| | | | | 454/187 |
| 2017/0028472 | A1 * | 2/2017 | Shaw | B22F 10/73 |
| 2018/0186081 | A1 * | 7/2018 | Milshtein | B29C 64/153 |
| 2018/0370263 | A1 * | 12/2018 | Mauck | B41J 29/13 |
| 2019/0022940 | A1 * | 1/2019 | Hofmann | B29C 64/268 |
| 2019/0022943 | A1 * | 1/2019 | Schödel | B33Y 10/00 |
| 2019/0270250 | A1 * | 9/2019 | Sartori | B29C 64/25 |
| 2020/0114425 | A1 * | 4/2020 | Ott | B33Y 10/00 |
| 2020/0156319 | A1 * | 5/2020 | Döhler | B29C 64/393 |
| 2021/0023785 | A1 * | 1/2021 | Sosnowski | B29C 64/314 |
| 2021/0122108 | A1 * | 4/2021 | Alejandre Fernandez | B29C 64/393 |
| 2021/0354391 | A1 * | 11/2021 | Echevarria Lopez | B29C 64/393 |
| 2022/0016832 | A1 * | 1/2022 | Tjellesen | B22F 12/60 |
| 2023/0001635 | A1 * | 1/2023 | Garrido | B29C 64/25 |
| 2023/0182389 | A1 * | 6/2023 | Lange | B29C 64/232 |
| | | | | 264/497 |
| 2024/0367378 | A1 * | 11/2024 | Garrido Barrabes | B08B 15/00 |

FOREIGN PATENT DOCUMENTS

| | | | | |
|---|---|---|---|---|
| KR | 102024906 | B | 9/2019 | |
| WO | 2004/005014 | A2 | 1/2004 | |
| WO | WO-2020023032 | A1 * | 1/2020 | B29C 64/165 |

* cited by examiner

EXTRACTION SYSTEM FOR APPARATUS FOR THE LAYER-BY-LAYER FORMATION OF THREE-DIMENSIONAL OBJECTS, AND ASSOCIATED METHODS AND CONTROLLER

FIELD OF THE INVENTION

The present disclosure relates to an extraction system for an apparatus for the layer-by-layer formation of three-dimensional (3D) objects from particulate material, an apparatus comprising the gas extraction system, methods for operating the apparatus comprising the gas extraction system, and a controller for controlling the apparatus and carrying out the methods.

BACKGROUND

In three-dimensional printing technology, three-dimensional objects can be formed in a layer-wise manner using known methods or processes of manufacturing, such as selective laser sintering, selective laser melting, electron beam melting, and so-called "print and sinter" processes. In these 3D manufacturing processes, layers of particulate material are successively spread on a build bed surface of a build bed, and portions of successive layers are selectively solidified to form the layers of the three-dimensional object. Each layer of particulate material is selectively fused, sintered or melted by applying energy, heat or radiation, so that layer-by-layer the three-dimensional object is formed.

During a typical build process, the temperature of the build bed and temperature of the components within the working space is prone to fluctuate, for example due to one or more of (a) a sintering lamp being applied intermittently across the build bed surface, leading to hot and cold periods; (b) a new layer of particulate material being applied; (c) a preheat lamp being applied intermittently across the build bed surface; and (d) carriages on which a powder distribution device, printheads or lamps are mounted, passing across the build bed surface. Such carriages may comprise a hot surface, and also, as they travel across the build bed surface, may act to shield different portions of the build bed surface from an overhead heater. While such an overhead heater may be used to dynamically compensate for such thermal fluctuations, it cannot actively cool the build bed surface, and an additional level of thermal control is desirable.

Insufficient temperature control may lead to a lack of control of the build bed temperature which may result in warpage, shrinkage or curling of the three-dimensional object due to thermal effects. In addition, the degree of the effects can vary depending on the position within the build bed. Therefore, to control the temperature of the layer and/or build bed surface and in turn to control the temperature of the build bed, it is desirable to remove excess heat from the apparatus in which the three-dimensional object is being built.

Furthermore, by-products such as airborne particles, smoke, dust or fumes may be produced in a working space of such apparatus, during the three-dimensional printing process, and it is desirable to remove these from the working space so as to avoid their build up within the working space environment. To this end, an extraction system is required in order to purge the building area and avoid excessive accumulation of reaction by-products, suspended particulates and hot air in the building area. Process by-products and particulates suspended in the building area environment have to be effectively removed through to an external exhaust. At the same time, it is convenient to have an extraction system next to the building area that can extract hot air in a controlled fashion. This would allow an improved control of the temperature in the building area. An improved control of the temperature in the building area helps to avoid excess temperature rise during the process and allows a more homogeneous temperature to be achieved across the build bed surface. Therefore a controlled extraction system may contribute to the overall quality of the three-dimensional objects, as well as removing by-products from the working space.

In many industrial premises a site extraction system is provided to extract dust, fumes and the like from a manufacturing room, and/or to provide ventilation. However, it will of course be appreciated that it is not good practice to allow airborne particles, smoke, dust or fumes from a 3D manufacturing apparatus to simply vent into the manufacturing room, to be extracted by the site extraction system, as this would expose human operators to the airborne particles, smoke, dust or fumes, contrary to health and safety requirements. On the other hand, there are challenges associated with coupling a site extraction system to a 3D manufacturing apparatus. For instance, using a site extraction system of typically high flow rates may cause challenges in adequately controlling the temperature in the working space. In addition, with more than one apparatus or other equipment connected to the site extraction system, the flow rate per apparatus will change. Although a flow rate control may be applied to the external extraction source, this can be costly and also removes the ability to have full flow control from the apparatus side. Furthermore, if active flow control devices are added within the apparatus, they may easily be overpowered by the more powerful site extraction system. In addition, it is necessary to apply dynamic monitoring of parameters that affect the temperature of the working space such as flow rate applied to the gas extraction system and through the working space, and a control system that is capable of interacting with the apparatus in response to analysis of such monitoring.

The present invention provides a gas extraction system for an apparatus for the layer-by-layer formation of three-dimensional objects from particulate material, and an apparatus for the layer-by-layer formation of three-dimensional objects from particulate material implementing such a gas extraction system, that is capable of addressing the above described needs and problems. The present invention furthermore provides a controller for controlling the gas extraction system and/or the apparatus in response to parameters monitored in relation to the temperature and flow conditions in the working space and through the gas extraction system.

SUMMARY

Aspects of the invention are set out in the appended independent claims, while details of particular embodiments of the invention are set out in the appended dependent claims.

According to a first aspect of the invention there is provided an apparatus for the layer-by-layer formation of three-dimensional objects, the apparatus comprising a gas extraction system and an enclosed working space from which gas is to be extracted, wherein the working space is enclosed by side walls, a ceiling and a working surface, and comprises a working space inlet for allowing gas to enter into the working space, a working space outlet for allowing gas to exit the working space, and a build bed surface in which a layer of the object is formed;

wherein the gas extraction system comprises:

a primary conduit comprising at least a first primary inlet, at least a first interfacing inlet, and a primary outlet; and at least a first secondary conduit comprising a respective first secondary inlet and a respective first secondary outlet, the first secondary inlet being in fluidic communication with the working space for extracting gas from the working space, and the first secondary outlet being in fluidic communication with the first interfacing inlet;

wherein the or each primary inlet is open to an environment external to the working space, and wherein the primary outlet is connectable to an external extraction source so as to suction gas from the primary conduit; and wherein the gas extraction system further comprises one or more flow control devices for controlling the flow of gas from the working space into the first secondary conduit, and thence into the primary outlet of the primary conduit.

According to a second aspect, a method of extracting gas from the apparatus of the first aspect is provided, the method comprising:

(a) extracting gas from the working space via the secondary conduit comprising a respective secondary inlet and a secondary outlet, the secondary inlet receiving gas from the working space; while (b) moving the gas from the secondary conduit via the secondary outlet to the primary conduit via the first interfacing inlet of the primary conduit; while (c) extracting the gas from a primary outlet of the primary conduit by operating the external extraction source connected to the primary outlet; and while (d) suctioning, by operating the external extraction source, a flow of gas from an environment external to the working space into the primary conduit via a primary inlet of the primary conduit that is open to the environment external to the working space, such that the gas extracted from the primary conduit in step (c) is a mixture of gas extracted from the working space via the first interfacing inlet and gas suctioned from the external environment to the working space via the primary inlet.

According to a third aspect, a controller is provided that is configured to carry out the method of the second aspect, wherein the controller is configured to control the at least one internal flow control device and to receive measured values from the one or more sensors.

BRIEF DESCRIPTION OF THE DRAWINGS

Embodiments will now be described with reference to the accompanying Figures, in which.

In the Figures, like elements are indicated by like reference numerals throughout.

DETAILED DESCRIPTION OF THE DRAWINGS

Figure 1:
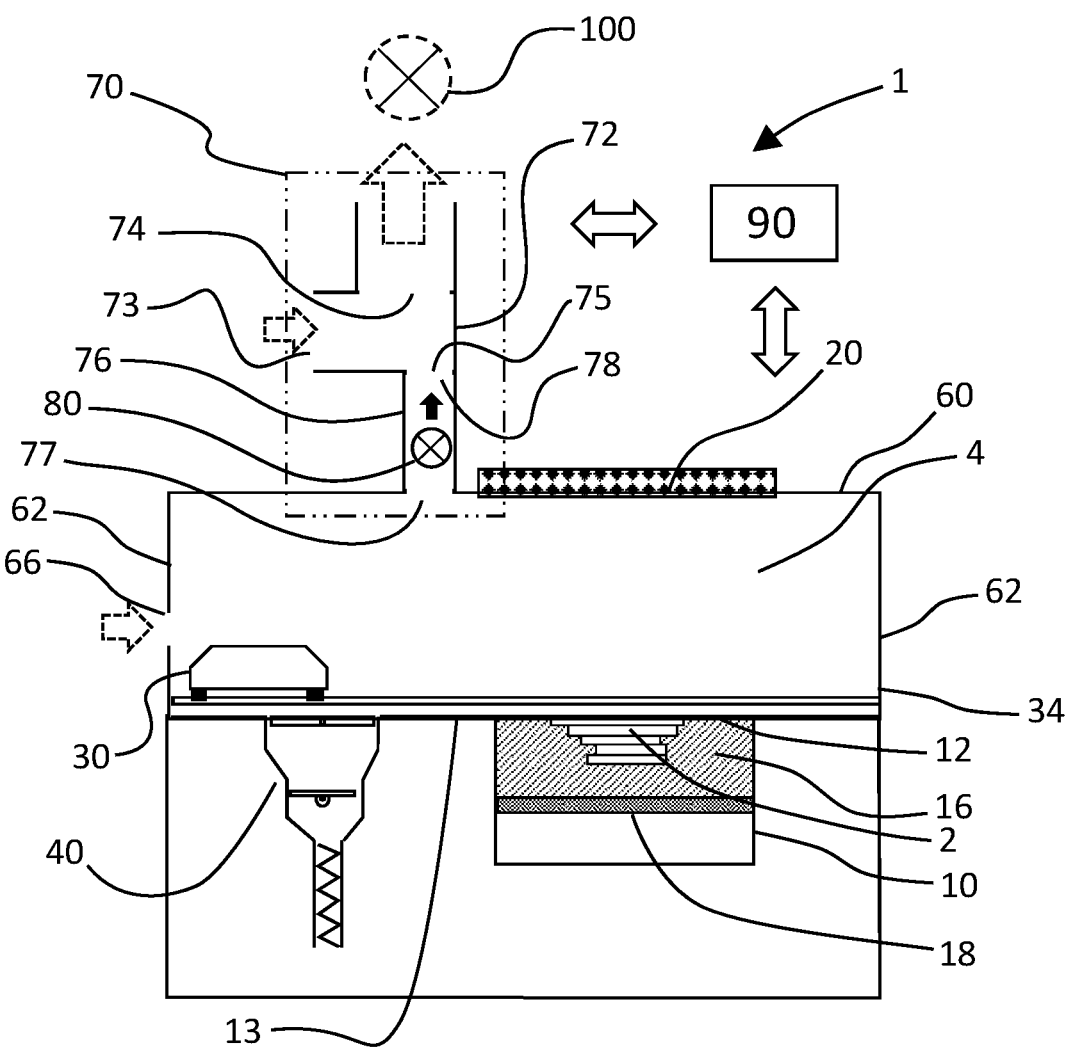
FIG. 1 is a schematic diagram of a cross-section through an apparatus for the layer-by-layer formation of three-dimensional objects by the consolidation of particulate material comprising a gas extraction system.

FIG. 1 shows a cross-sectional front view of an apparatus 1 for the layer-by-layer formation of three-dimensional objects by the aggregation of particulate matter by high speed sintering. The apparatus 1 has a working space 4 bounded by end walls 62, a working surface 13, and a ceiling 60. A gas extraction system 70 extracts gas from the working space 4 via a secondary inlet 77. The gas may enter the working space at any suitable location, for example inlet 66 located in an end wall 62.

First, a typical process for the generation of a 3-dimensional object from powder with reference to a "print and sinter" process will now be described. The working surface 13 comprises a build bed surface 12, which is the surface over which successive layers of particulate material, such as powder, are distributed and processed to form cross-sections of the object 2. The apparatus 1 further comprises a powder container system which comprises a build bed 16 supporting the formed object 2 and having the build bed surface 12 from which the object 2 is formed, layer by layer. An example of a powder dosing module 40 arranged to dose fresh powder to the working surface 13 to one side of the build bed surface 12 is shown.

The powder may be a polymeric material such as PA11. A carriage 30 is movably arranged on one or more rails 34 to allow it to be moved back and forth across the build bed surface 12. The carriage 30 may comprise a distributor module, a printing module and a lamp module (not shown in FIG. 1). With the carriage 30 in the position as shown, a dose of PA11 polymer powder is provided to the working surface 13 at a location between the carriage 30 and the build bed surface 12. Next, the carriage 30 is operated to move across the working surface 13, so that the distributor module distributes the powder across the build bed surface 12. Located behind the distributor module, with respect to the direction of motion, is the printing module. Printheads of the printing module deposit fluid containing radiation absorber, such as carbon black, at selected locations defined by the cross section of the object to be formed within the specific layer of distributed powder. Located behind the printing module, with respect to the direction of motion, is the lamp module. An infrared lamp (of the lamp module) spanning the width of the build bed surface 12 is operated to irradiate the build bed surface 12 with infrared radiation so as to consolidate the powder that has received the radiation absorber fluid. In this illustrative process, the three steps of distribution, printing and consolidation by irradiation happen sequentially as the carriage 30 moves across the build bed surface 12 in one stroke. At the end of the stroke, the carriage 30 returns to the starting position and the process repeats for the next layer until the object 2 is fully formed. It will be appreciated that, in alternative implementations, other arrangements of carriages are possible (e.g. having more than one carriage), to provide the distribution, printing and irradiation/consolidation functions.

During the process of building the object 2, the working space 4 may be filled with hot ink fumes and powder particles, and the atmosphere may typically reach temperatures ranging from about 60° C. to 120° C. By providing a controllable and adjustable flow of gas through the working space 4, using the gas extraction system according to the present disclosure, the temperature of the working space 4 and of the build bed surface 12 may be managed more effectively and reliably, and undesirable fumes and particles may be removed. During the process of building the object 2, the temperature of the build bed surface 12 may fluctuate and requires accurate control to provide uniform and high-quality properties in respect of the manufactured object. Such control may be improved or achieved if a controllable flow of gas through the working space 4 is provided when the apparatus 1 is connected to a site ventilation system. The site ventilation system typically provides a high flow rate that may reduce the effectiveness of other flow control devices within the apparatus. It has been found by the inventors that the gas extraction system 70 in accordance with the present disclosure is able to provide a controllable and adjustable flow of gas out of the working space 4 of the apparatus 1 even when it is connected to the high suction of the site ventilation system.

In accordance with an embodiment of the present invention therefore, and with reference initially to FIG. 1, an apparatus 1 is provided that comprises a gas extraction system 70 and an enclosed working space 4 from which gas is to be extracted. The working space 4 is enclosed by side walls 62, a ceiling 60 and a working surface 13, and comprises a working space inlet 66 to allow gas to enter into the working space 4, a working space outlet to allow gas to exit the working space 4, and a build bed surface 12 in which a layer of the object 2 is formed. The gas extraction system 70 comprises a primary conduit 72 comprising at least a first primary inlet 73, at least a first interfacing inlet 75, and a primary outlet 74. The gas extraction system 70 further comprises at least a first secondary conduit 76 comprising a respective first secondary inlet 77 and a respective first secondary outlet 78, the first secondary inlet 77 being in fluidic communication with the working space 4 for extracting gas from the working space 4, and the first secondary outlet 78 being in fluidic communication with the first interfacing inlet 75. The or each primary inlet 73 is open to an environment external to the working space 4, and the primary outlet 74 is connectable to an external extraction source 100, such as the site extraction system of the premises in which the apparatus 1 is located, so as to suction gas from the primary conduit 72. Furthermore, one or more flow control devices 80 are provided within the gas extraction system 70 for controlling the flow of gas from the working space 4 into the first secondary conduit 76, and thence into the primary outlet 74 of the primary conduit 72. Upon connection to the external extraction source 100, the flow extracted by the external extraction source equals the combined flow into the primary conduit 72 from the primary inlet(s) 73 and from the secondary outlet(s) 78.

By virtue of such an arrangement of conduits, the external extraction source 100 is able to extract airborne particles, smoke, dust or fumes from the working space whilst remaining sufficiently separated from the working space to not adversely influence the behaviour or control of the apparatus within the working space.

With reference to FIGS. 2 to 8, various implementations of the gas extraction system 70 will now be described. With reference to FIG. 9, it is further illustrated how a variant of the gas extraction system 70 may be implemented within an apparatus for manufacturing a three-dimensional object from particulate material.

EXAMPLE 1: FIGS. 2A, 2B, 3A, 3B and 4
HAVING ACTIVE FLOW DEVICES (e.g. FANS)

Figure 2A:
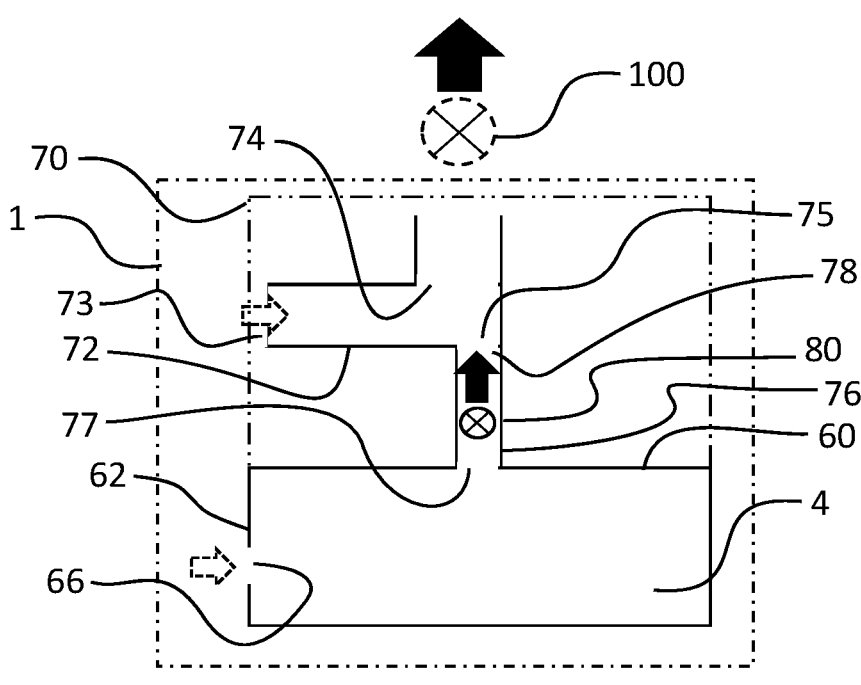
FIGS. 2A, 2B, 3A, 3B and 4 are schematic diagrams of cross-sections through variants of the gas extraction system comprising at least one active flow control device.
Figure 2B:
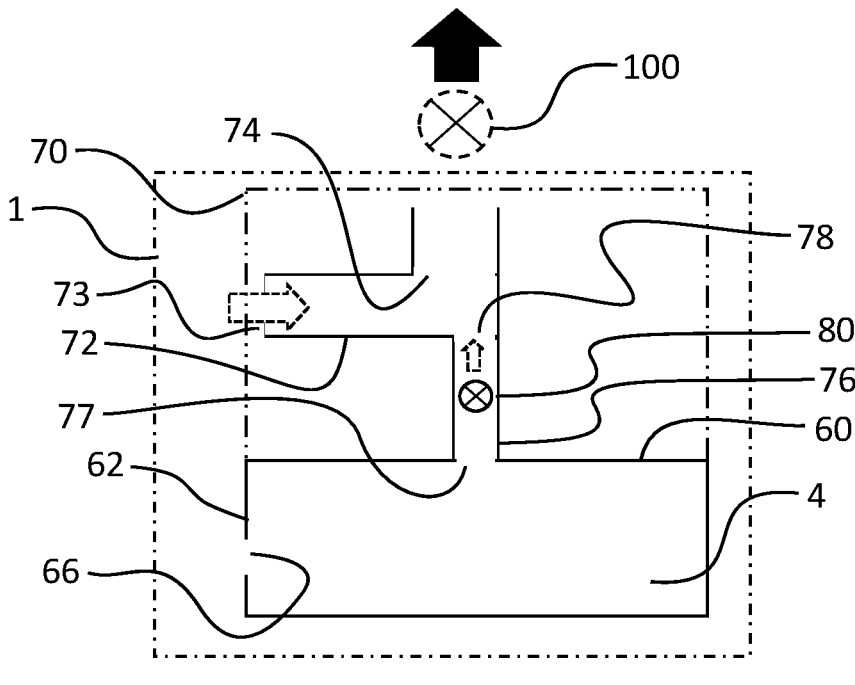

FIGS. 2A and 2B are schematic diagrams illustrating an embodiment of an apparatus 1 having a working space 4 and comprising a gas extraction system 70 external to the working space 4. The ceiling 60 of the working space 4 comprises a secondary inlet 77, such that the secondary inlet 77 is in fluidic communication with the working space 4 below. The primary conduit 72 has a primary inlet 73, a primary outlet 74 connectable to an external extraction source 100, and an interfacing inlet 75 connected to a secondary outlet 78. A side wall 62 of the apparatus 1 further comprises a working space inlet 66 for allowing gas, such as ambient air, to enter the working space 4 upon applying suction to the secondary inlet 77.

In variants of the gas extraction system 70 where only one secondary conduit 76 and one primary inlet 73 is present, such as the one shown in FIGS. 2A and 2B, the secondary outlet 78 is fluidically connected to the interfacing inlet 75 in a region between the first primary inlet 73 and the primary outlet 74.

In the example gas extraction system 70 of FIGS. 2A, 2B, 3A, 3B and 4, the flow control device 80 is a fan located in the secondary conduit 76 that is capable of moving gas from the secondary inlet 77 to the secondary outlet 78, and into the primary conduit 72 where the gas may be extracted via the primary outlet 74. Thus, the flow control device may be located in the secondary conduit 78. Likewise, if more than one secondary conduit is present, more than one flow control device may be located in the secondary conduits. For example, a respective flow control device may be located in each of the secondary conduits.

In the Figures, arrows indicate the direction of flow from the various inlets and outlets of the apparatus 1. Arrows drawn in dashed outline indicate a passive flow induced by suction, or negative pressure, generated by an active device located elsewhere, such as the fan 80 and the external source of extraction 100. FIG. 2A illustrates a situation where the fan 80 is operating, such that the fan moves gas from the working space 4 into the secondary inlet 77, through the secondary conduit 76 and into the primary conduit 72 via the secondary outlet 78/interfacing inlet 75. Upon connection to an external source of extraction 100, which extracts more gas from the primary conduit 72 out of the primary outlet 74 than the fan 80 can deliver into the primary conduit 72, additional gas is drawn into the primary conduit 72 via the open primary inlet 73. The primary inlet 73 is fluidically connected to an exterior of the working space 4.

FIG. 2B illustrates flow through the system with the fan (flow control device) 80 switched off. In this situation the external extraction source 100 draws gas mainly from the primary inlet 73. The conduits 72, 76 may be dimensioned as required with respect to the minimum and maximum airflow the fan 80 can provide into the primary conduit 72, so that within normal operating conditions of the fan during a build process the fan is not overpowered by the external extraction source 100, as if the fan were overpowered the flow rate through the secondary conduit would thus become uncontrollable at apparatus level. The conduits 72, 76 may further be dimensioned such that when the fan is not working, a minimal flow is extracted through the secondary conduit 76; for example the flow path from the primary inlet 73 to the primary outlet 74 has a sufficiently lower resistance to flow than the path from the secondary inlet 77 to the secondary outlet 78. To prevent flow through the secondary conduit 76 in this situation, a shut off valve (such as a butterfly valve, for example) may be provided at a location within the secondary conduit 76 (including at the secondary outlet 78 or inlet 77) that blocks any flow of gas when the fan is not operating. This may be useful in situations where it is desirable that the working space 4 is undisturbed by gas flow from the working space inlet 66 to the secondary inlet 77.

The primary inlet 73 may be an open inlet, such that inflow of gas into the primary inlet 73 is unimpeded. If the primary inlet were impeded or closed, the fan 80 may be overpowered by the external source of extraction 100 such that the fan speed is no longer controllable, and the flow of gas from the secondary inlet 77 to the secondary outlet 78 and into the primary conduit 72 is instead governed by the suction applied by the external extraction source 100 to the primary outlet 74.

In a controlled build process to form an object 2, it may be desirable to alter the flow of gas into the secondary inlet 77 dynamically during the build, or from one build to the next, thus altering the flow of gas through the working space 4.

It is thus possible to sufficiently decouple the flow control device (here fan 80) from the influence of the site ventilation. This may be achieved by providing one or more primary inlets 73 and a primary conduit 72 arranged, based on a predefined maximum volume flow rate of extraction provided by the external source of extraction 100, to allow a balancing inflow of air through the primary inlets 73 that makes up the difference between the volume flow rate from the one or more secondary outlets 78 into the primary conduit 72 and the volume flow rate into the primary outlet 74 due to the external source of extraction 100.

Using computational fluid dynamics (CFD) modelling, the decoupling level was assessed by the speed of gas flow on the secondary conduit inlets when operating only the external extraction source, to assess how much "extraction" (in terms of flow speed and known cross sectional area of the flow path, so volumetric flow) the working space experiences with no active internal apparatus ventilation. The ratio between extracted volumetric flow at the external extraction source side (or primary outlet) versus the volumetric flow experienced by the working space was defined as the degree of decoupling.

From CFD results the speed of gas was around 1-2 m/s at the secondary conduit inlet, and around 10 m/s at the primary outlet. If the secondary conduit inlets (e.g. two secondary conduit inlets) have a combined inlet area equal to that of the external extraction source side (primary outlet), this means that the speed of gas is 2-4 m/s at each secondary conduit inlet vs 10 m/s at the primary outlet for the same cross section, or between 20-40% of the gas flow is coupled, and 60-80% decoupled. "Decoupling" means that the control of the fan is not adversely affected by the external source of extraction to such a degree that gas flow through the working space cannot be adequately controlled by the fan as required during the build process.

The ratio of volume flow rates from the primary inlet(s) 73 and from the secondary outlet(s) 78 into the primary conduit 72 is determined by the respective flow resistances of the flow paths between the or each primary inlet 73 and the primary outlet 74, and between the or each secondary inlet 77 and the respective secondary outlet 78, with respect to FIGS. 2A and 2B, where the flow path resistance includes friction and turbulence due to tube geometry. The secondary conduit 76 will always have a non-infinite value of flow resistance, and the fan will have a maximum head pressure, which in combination defines the volume flow rate of gas through the secondary conduit 76. Meanwhile the primary inlet 73 and primary conduit 72 will also have a finite (non-zero) flow resistance. Thus the degree of decoupling needed is determined by the components used, the flow resistance of the paths, and the requirements of control achievable by the fan over the temperature of the working space 4.

Generally, for the embodiment of FIGS. 2A, 2B, 3A, 3B and 4 it is preferable that the flow resistance of the primary conduit 72 is lower than the flow resistance of the combined secondary conduits 76.

Figure 3A:
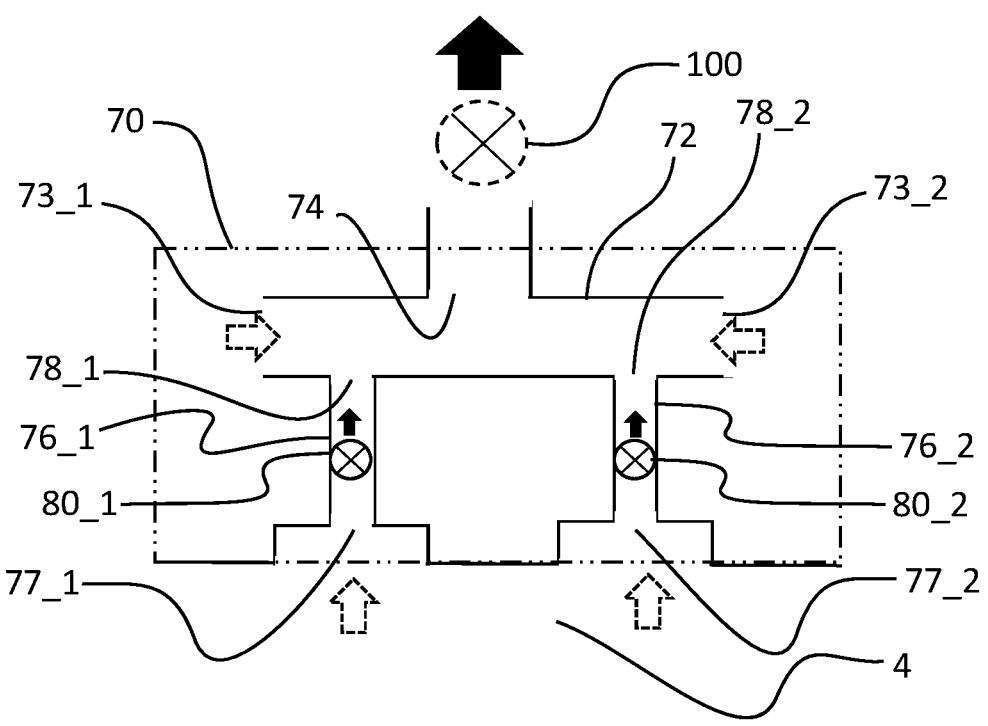
Figure 3B:
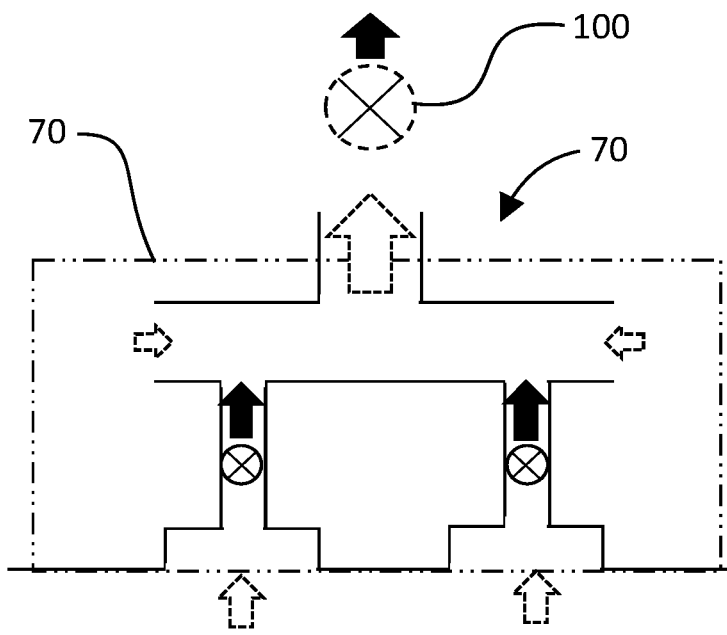

In some apparatus, it may be beneficial to arrange gas extraction in more than one location. For example, two or more secondary inlets may be provided in the ceiling of the apparatus, for example two secondary inlets in the form of elongate slots facing toward the working surface to either side of the build bed surface 12 and spanning the width (in the y-direction) of the build bed surface. Thus, as illustrated in FIGS. 3A and 3B, a first secondary conduit 76_1 and a second secondary conduit 76_2 may be provided. The first secondary conduit 76_1 comprises a respective first secondary inlet 77_1 in fluidic communication with the working space 4, and a respective first secondary outlet 78_1 in fluidic communication with a respective first interfacing inlet of the primary conduit 72. Likewise, the second secondary conduit 76_2 comprises a respective second secondary inlet 77_2 in fluidic communication with the working space 4, and a respective second secondary outlet 78_2 in fluidic communication with a respective second interfacing inlet of the primary conduit 72. FIGS. 3A and 3B show the gas extraction system 70 only, for simplicity, and in analogy to FIG. 2. Each secondary conduit 76_1, 76_2 may comprise a flow control device 80_1, 80_2, such as a fan. The secondary conduits 76_1, 76_2 may be arranged to be fluidically identical to one another.

The gas extraction system 70, and more particularly the primary conduit 72, may comprise first and second primary inlets 73_1 and 73_2, arranged such that the secondary outlets 78_1 and 78_2 are connected to the primary conduit 72 in a symmetric arrangement with respect to the primary inlets 73_1, 73_2. The primary inlets 73_1, 73_2 may be identical in flow properties and be located at either end of the primary conduit 72, for example with the primary conduit being a constant diameter pipe and with the first and second secondary outlets 78_1 and 78_2 connected at equal distances to corresponding interfacing inlets (not shown), or to have equal flow properties over respective first and second distances, between the first primary inlet 73_1 and the first secondary outlet 78_1 and between the second primary inlet 73_2 and the second secondary outlet 78_2, as indicated in FIG. 3A. Since each secondary conduit 76_1, 76_2 has an individually controllable fan, the flow into each secondary inlet 77_1, 77_2 is individually controllable. The working space 4 may further comprise a second working space inlet 66 located at an end wall opposite to the first working space inlet 66. This is indicated in FIG. 9, showing an apparatus 1 comprising the gas extraction system 70 of FIG. 3A. The flow from the first working space inlet 66_1 to the first secondary inlet 77_1 may thus be controlled to be different to the flow from the second working space inlet 66_2 to the second secondary inlet 77_2; alternatively, in the case where working space geometry generates different flow rates for the same fan speeds, the fans 80 may be used to balance the two flows through the working space 4.

Figure 4:
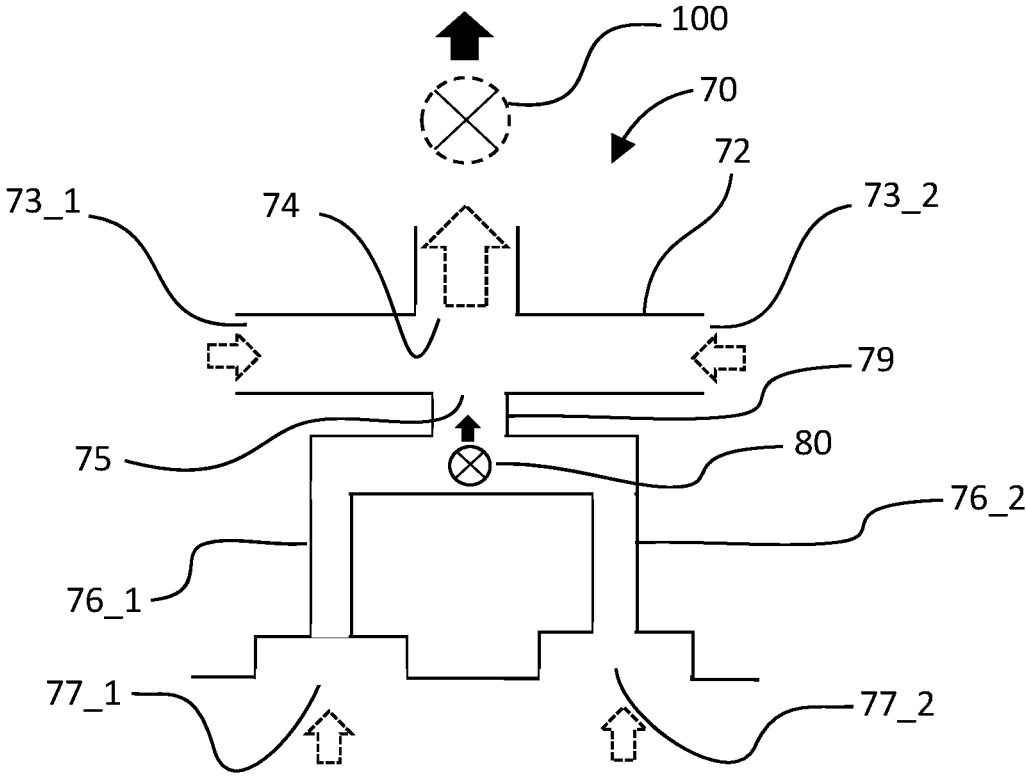

Optionally, therefore, a first flow control device 80_1 may be located in the first secondary conduit 76_1, and a second flow control device 80_2 may be located in the second secondary conduit 76_2. In the implementation of FIGS. 2 to 4, at least one of the flow control devices 80 is a fan for moving gas from the secondary inlets 77 to the secondary outlets 78.

FIGS. 3A and 3B show the gas extraction system 70 in operation at different flow rates provided by the fans 80_1, 80_2. In FIG. 3B the fans provide a higher flow than in FIG. 3B, as indicated by the comparative sizes of the arrows. For the higher flow rate provided by the fans in FIG. 3B, the inflowing gas into the primary inlets 73_1, 73_2 is correspondingly lower for a constant extraction rate by the external extraction source 100, as indicated by the sizes of the dashed arrows.

In an alternative arrangement comprising only one fan, the two secondary conduits 76_1, 76_2 are merged and coupled to a confluent portion 79 which is connected to the interfacing inlet 75 of the primary conduit 72. This arrangement is shown in FIG. 4.

Thus, in some implementations, the secondary conduits may comprise a first secondary conduit 76_1 and a second secondary conduit 76_2. A confluent portion 79 having first and second ends is also provided. The first secondary conduit 76_1 comprises a respective first secondary inlet 77_1 in fluidic communication with the working space 4, and a respective first secondary outlet 78_1. Likewise, the second secondary conduit 76_2 comprises a respective second secondary inlet 77_2 in fluidic communication with the working space 4, and a respective second secondary outlet 78_2. The first secondary outlet 78_1 and the second secondary outlet 78_2 are in fluidic communication with the first end of the confluent portion 79 and arranged so as to combine the flows from the first and second secondary outlets 78_1, 78_2 into the confluent portion 79. The interfacing inlet 75 of the primary conduit 72 is in fluidic communication with the second end of the confluent portion, so as to receive the combined flows from the confluent portion. The flow control device 80 in this example is again a fan, which may be located at a location within the secondary path as required. For identical first and second conduits for which identical flow conditions are to be set up, the flow control device 80 may be located at the merging location of the secondary conduits, or in the confluent portion 79. In other words, two or more secondary conduits may share the same flow control device.

In the case of a shared fan, the flow through each secondary conduit may be controlled by further flow control devices, such as by flow restrictors that can restrict the cross sectional area of a portion of the flow path, positioned in each of the secondary conduits. For example, some or all of the secondary conduits (in the case of FIG. 4, conduits 76_1 and 76_2) may each comprise an individually controllable flow restrictor, upstream of the shared fan, so as to adjust the flow resistance of each secondary conduit and thus alter the volume flow rate out of the respective secondary outlet.

Thus, at least one of the flow control device(s) may be located in at least one of the secondary conduit(s). Moreover, a first further flow control device may be located in a first secondary conduit, and a second further flow control device may be located in a second secondary conduit.

The further flow control device may be an adjustable flow restrictor for restricting the flow of gas from the secondary conduit into the primary conduit. The degree of flow restriction may thus be altered so that the flow through the two secondary conduits may be adjusted dynamically. This in turn will alter the flow profile through the working space 4.

As illustrated further in FIG. 9, providing two secondary inlets 77_1, 77_2 in fluidic communication with the working space 4 (where the flow through each secondary conduit 76_1, 76_2 may be individually controllable) may be advantageous where the working space 4 comprises at least two working space inlets, located such that each secondary inlet receives gas flow substantially from a respective working space inlet 66_1, 66_2,.

While FIGS. 2A, 2B, 3A, 3B and 4 show gas extraction systems in which a fan actively provides flow through the secondary conduits 76_1, 76_2, an alternative arrangement of flow control devices within the gas extraction system 70 may be provided that achieves a similar effect. In such a gas extraction system 70, the sole source of extraction may be provided by the external extraction source 100. This will now be illustrated with reference to FIGS. 5, 6, 7A and 7B.

Figure 5:
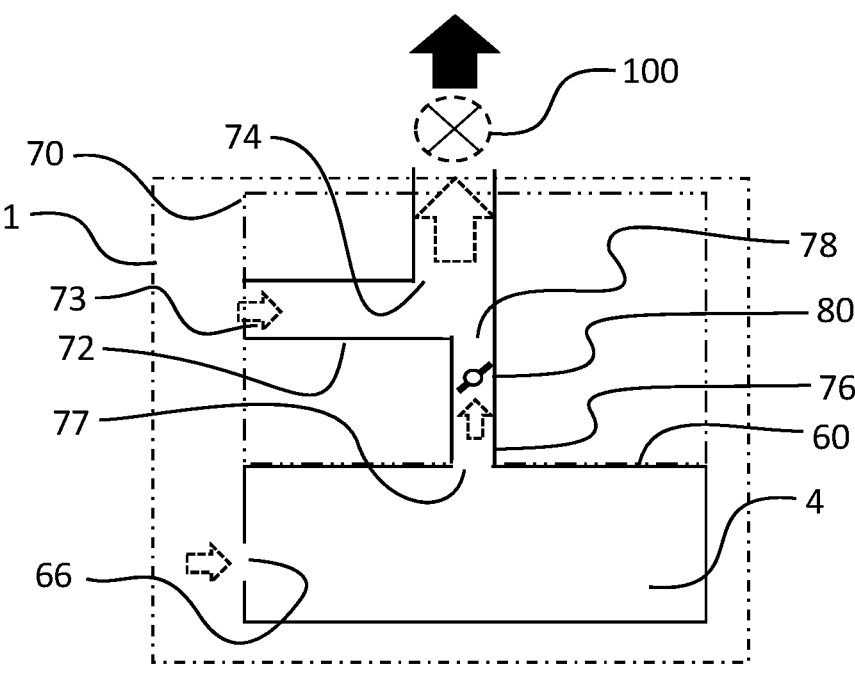
FIGS. 5, 6, 7A and 7B are schematic diagrams of cross-sections through further variants of the gas extraction system comprising at least one passive flow control device and in which the external extraction source alone provides flow.

EXAMPLE 2: FIGS. 5, 6, 7A and 7B WITH PASSIVE FLOW CONTROL DEVICES (e.g. FLOW RESTRICTORS) USING EXTERNAL EXTRACTION AS THE ONLY SUCTION SYSTEM The gas extraction system 70 shown in FIG. 5 is an alternative to that shown in FIG. 2A and in which the flow device 80 is a flow restrictor, with all parts of the system labelled with like numerals. Maximum flow through the secondary conduit 76 is achievable when the flow restrictor is at a setting where it least restricts the flow through the conduit, i.e. when the conduit presents the lowest possible resistance to gas flow. Conversely, minimum or no flow is achieved when the flow restrictor is at a setting where it restricts most of, or completely blocks, the flow through the conduit 76, i.e. when the conduit 76 presents the highest achievable resistance to gas flow. In either case the absolute flow values are governed by the volume flow rate into the primary outlet 74 as provided by the suction of the external extraction source 100. As with the system in FIG. 2, the primary inlet 73 is open to inflowing gas from an environment external to the working space 4. Similar design considerations apply with respect to the flow path resistance between the primary inlet 73 and the primary outlet 74, and between the secondary inlet 77 and the secondary outlet 78. The secondary outlet connects to the interfacing inlet (not labelled) of the primary conduit 72. In this variant of the gas extraction system 70, the flow through the secondary conduit 76 may be controlled by adjusting the flow restrictor setting, so that either more or less gas is suctioned into the primary inlet 73 depending on the flow restrictor setting.

Therefore, at least one of the flow control device(s) 80 may be an adjustable flow restrictor capable of altering the flow resistance between the first primary inlet 73 and the primary outlet 74.

Different locations of the flow restrictor may be envisaged. For example, the flow restrictor may alternatively, or additionally, be located at or near the working space gas inlet 66 to control the gas flow into the working space gas inlet.

Figure 6:
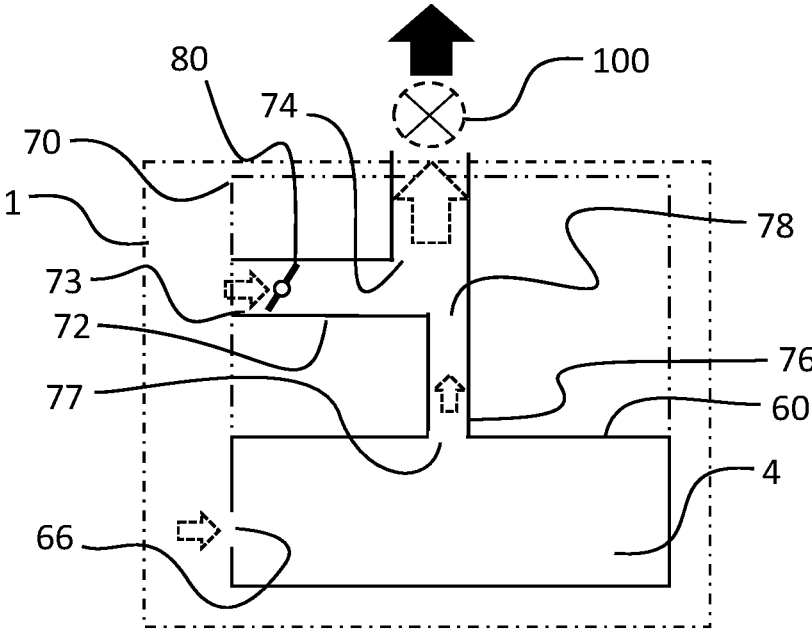

Additionally, or instead, a flow restrictor may be located between the first primary inlet 73 and the first interfacing inlet 75, so as to control the inflow of gas into the primary conduit 72 via the primary inlet 73. An apparatus having a gas extraction system 70 with such a flow restrictor 80 positioned at or near the primary inlet 73 instead of in the secondary conduit 76 is shown in FIG. 6. As with the variant in FIG. 5, the flow through the secondary conduit 76 may be controlled by adjusting the setting of the flow restrictor 80 at or near the primary inlet 73 (or in the example of FIG. 6, at any position between the primary inlet 73 and the primary outlet 74 and before the interfacing inlet that connects to the secondary outlet 78), so that either more or less gas is drawn into the primary inlet 73 depending on the restrictor setting.

Therefore, the primary conduit, for example at or adjacent to the primary inlet 73 may comprise an adjustable flow restrictor, such as a baffle or butterfly valve, operable to restrict or shut off inflowing gas.

Figure 7A:
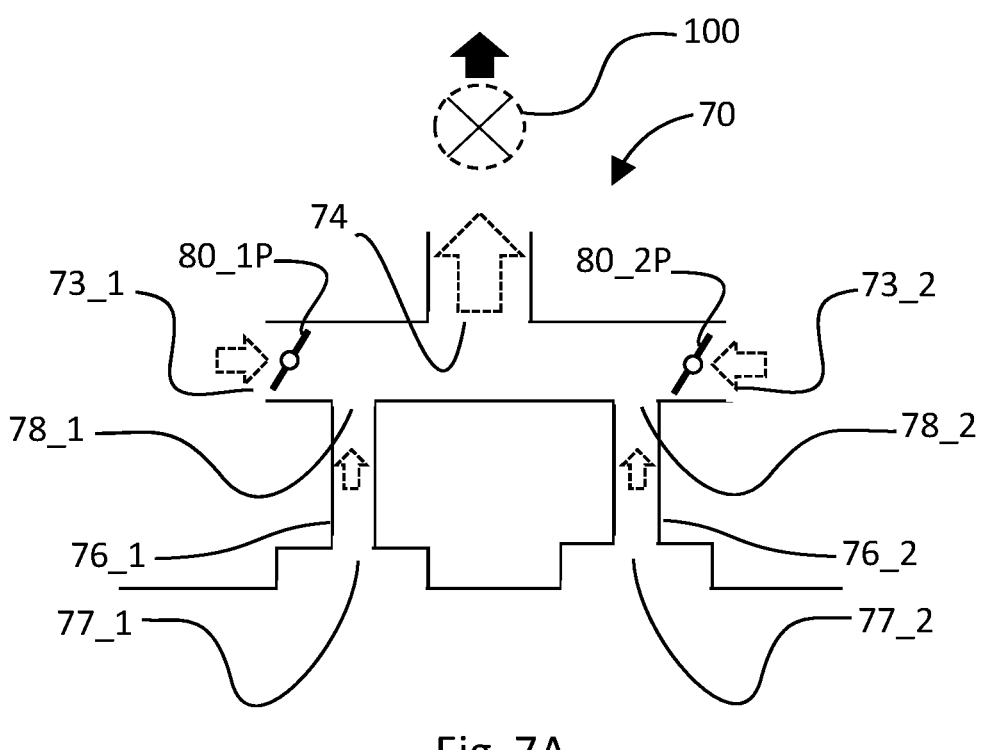

FIG. 7A shows a variant of FIG. 6 and is equivalent in conduit arrangement to that of FIG. 3A, in which two secondary conduits 76_1, 76_2 and two primary inlets 73_1, 73_2 are provided. A flow restrictor 80_1P, 80_2P is provided at each primary inlet 73_1, 73_2 respectively. Again the position of each flow restrictor 80_1P, 80_2P is such that it is located at some location between the primary inlet 73_1, 73_2 and the closest interfacing inlet/secondary outlet 78_1, 78_2. The primary conduit 72 may thus comprise a second primary inlet 73_2 being at least partially open to the environment external to the working space.

Figure 7B:
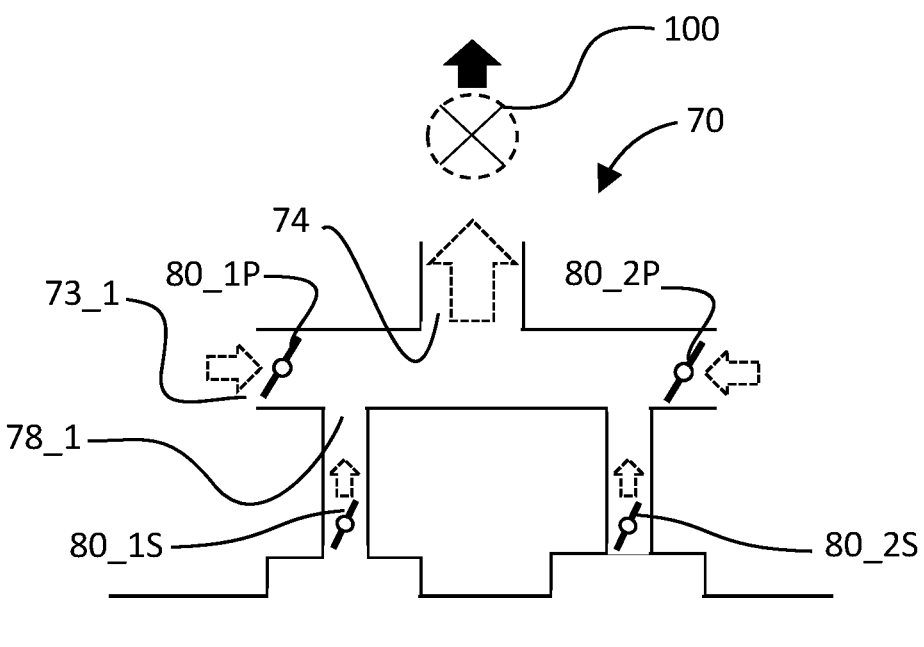

A further alternative arrangement of the gas extraction system 70 may be envisaged, combining the conduit arrangement of FIG. 3A and the flow restrictor location of FIG. 5, such that in each secondary conduit 76_1, 76_2 a flow restrictor is present to individually control the flow through each secondary conduit, while the source of extraction is the external extraction source 100 connected to the primary outlet 74. In this arrangement, the primary inlets 73_1, 73_2 may offer no impediment to inflowing gas. Optionally the primary conduit 72 may additionally comprise further flow restrictors to further adjust the inflow of gas into the primary inlets 73_1, 73_2. An example of such an arrangement is shown in FIG. 7B, where a first flow restrictor 80_1P is provided between the first primary inlet 73_1 and the first secondary outlet 78_1, and a second flow restrictor 80_2P is provided between the second primary inlet 73_2 and the second secondary outlet 78_2. The secondary conduits 76_1 and 76_2 each comprise a flow restrictor 80_1S and 80_2S. This arrangement may provide a larger more flexible and individually adjustable range of flow rate control.

It will be appreciated that the two or more secondary paths 76_1, 76_2 may be merged via a confluent portion 79 (equivalent to that of FIG. 4) before connecting to the primary conduit 72. Optionally, the confluent portion 79 may comprise an adjustable flow restrictor to control all secondary conduit flows, where the individual secondary conduit restrictors are optional, depending on whether individual control per secondary conduit is required.

Controller

The apparatus 1 may comprise a controller 90 configured to connect to and control the one or more flow control devices.

In this way, the controller 90 is generally configured to carry out a method of gas extraction from the working space 4 of the apparatus 1 utilising the gas extraction system 70 as described herein, the method comprising the steps of: (a) extracting gas from the working space 4 via the secondary conduit 76 comprising a respective secondary inlet 77 and a secondary outlet 78, the secondary inlet 77 receiving gas from the working space 4; while (b) moving the gas from the secondary conduit 76 via the secondary outlet 78 to the primary conduit 72 via the first interfacing inlet 75 of the primary conduit; while (c) extracting the gas from a primary outlet 74 of the primary conduit 72 by operating the external extraction source 100 connected to the primary outlet 74; and while (d) suctioning, by operating the external extraction source, a flow of gas from an environment external to the working space into the primary conduit 72 via a primary inlet 73 of the primary conduit that is open to the environment external to the working space 4, such that the gas extracted in step (c) is a mixture of gas extracted from the working space 4 via the first interfacing inlet 75 into the primary conduit 72 and gas suctioned from the external environment to the working space via the primary inlet 73 into the primary conduit 72.

Steps (a) and (b) may be carried out by operating an internal flow control device 80 located in the secondary conduit 76 to control the flow of gas through the secondary conduit. In a preferred implementation, the internal flow control device is a fan; further variants equally apply as described in relation to the apparatus herein.

In variants in which a sensor 92 is located at the primary inlet 73 of the primary conduit 72, the method may further comprise the steps of: detecting a property of the gas flow at the primary inlet 73; determining that the detected property is outside a normal operating range for a predetermined duration; and generating a failure signal. The sensor 92 may be a temperature sensor such as a thermistor, where the property detected is temperature.

A further sensor in the form of a flow meter may be located at the primary inlet 73 and/or outlet 74 of the primary conduit 72, the primary outlet 74 being connected to the external source of extraction 100; and the method may further comprise: detecting a property of the gas flow at the primary inlet and/or the primary outlet; determining that the detected property is outside a normal operating range for a predetermined duration; and generating a failure signal. The failure signal may terminate a build operation of the apparatus.

In a preferred variant of the method, the gas extraction system 70 may further comprise a second secondary conduit 76_2 and a second internal flow control device 80_2 located in the second secondary conduit (as illustrated for example in FIG. 8A), and wherein in parallel to steps (a), (b) and (d) further steps of the method comprise: (a1) extracting gas from the working space 4 via the second secondary conduit 76_2 comprising a respective second secondary inlet 77_2 and a second secondary outlet 78_2, the second secondary inlet 77_2 receiving gas from the working space 4; while (b1) operating the second internal flow control device 80_2 to control the flow of gas from the second secondary conduit 76_2 via the second secondary outlet 78_2 to the primary conduit 72 via a second interfacing inlet 75_2 of the primary conduit 72; and while (d1) suctioning, by operating the external extraction source 100, a flow of gas from an environment external to the working space into the primary conduit 72 via a second primary inlet 73_2 of the primary conduit 72 that is open to the environment external to the working space 4, such that the gas extracted in step (c) from the primary conduit 72 is a mixture of gas extracted from the working space 4 via the first and second interfacing inlets 75_1, 75_2 and gas suctioned from the external environment to the working space 4 via the first and second primary inlets 73_1, 73_2. The second internal flow control device 80_2 located in the second secondary conduit 76_2 is operated so as to control the flow of gas through the second secondary conduit 76_2.

The described methods and variants that may be envisaged based on the apparatus described herein provide a controllable and adjustable flow of gas out of the working space 4 of the apparatus 1 even when the apparatus is connected, via the gas extraction system, to the high suction of the site ventilation system. The working space inlet 66 may be open to an environment external to the working space, for example the inlet may be one or more holes that connect the working space 4 to the ambient environment, and the internal flow control device(s) provide the necessary suction to draw gas into the working space via the working space inlet(s) 66.

To carry out the methods, a controller is provided and configured to control the at least one internal flow control device 80, and/or to receive measured values from the one or more sensors 92.

The controller 90 may thus be configured to connect to one or more sensors of the apparatus 1. The sensors may be one or more of a temperature sensor, flow meter or pressure sensor or any other suitable sensor for monitoring flow and/or temperature of the apparatus, and may be located at any suitable location within one or more of the primary conduit 72, including one or more of the primary inlet(s) 73, primary outlet 74, interfacing inlet(s) 75; the secondary conduit(s) 76, including one or more of the secondary inlet(s) 77, secondary outlet(s) 78, or the confluent portion 79; and the working space 4; so as to provide a measurement of one or more of temperature, volume flow rate or gas pressure to allow an improved control of the working space temperature within the apparatus 1.

The controller 90 may have one or more of several functions. For example, to control the temperature of the working space 4, the flow rate through the secondary conduits 76 may be adjusted to remove more or less of the hot gas from the working space 4. For example, a target value of temperature may be defined for the working space 4, measured at one or more locations within the working space 4, or within the one or more secondary conduits 76 for example. The controller 90 may be configured to receive the target values and measured values and determine a deviation between the two, and then determine a suitable control signal that is provided by the controller to the flow control devices of the gas extraction system 70 so as to modify the rate of extraction and thus move closer to or achieve the target temperature. The control signal may for example be an adjusted power setting for the flow control device 80, in the case of a fan, or an adjusted position setting, in the case of a flow restrictor. These adjusted settings may be provided in the form of a lookup table that defines which setting is suitable for a determined deviation so as to achieve the target value.

Secondly, in case of failure or an extraction rate of the external extraction source 100 that is too low to provide sufficient extraction from the working space 4, and where the gas extraction system 70 comprises active flow devices within the secondary conduits 76, for example, the fans may continue to operate and draw hot gas from the working space 4 into the primary conduit 72 via the secondary conduit(s) 76. In the absence of extraction, or too low flow rates, through the primary outlet 74, this will lead to hot gases from the working space 4 backflowing through the primary inlets 73, i.e. flowing in a direction opposite to the intended direction so that hot gas (and any fumes/particulates contained therein) is released to the external environment outside the working space 4. This is undesirable. In these cases, the fans in the secondary conduits 76 may be turned off by the controller 90 in response to one or more of the following:

In one implementation, one or more temperature sensors may be located at or near the primary inlet(s) 73. The controller 90 is configured to receive a maximum value for temperature that is acceptable to represent a normal operating range at or near the primary inlet(s) and above which a low flow or failure of the external extraction source 100 is indicated. The controller further receives one or more measured values of temperature from the one or more temperature sensors, and determines whether a measured value exceeds the maximum acceptable value. If the maximum acceptable value is exceeded, the controller provides an alert such as a failure signal to the user.

In another implementation, one or more flow meters (where a flow meter is a type of sensor) may be located at or near the primary inlet(s) 73, or at the primary outlet 74. The flow meters are configured to detect a gas flow rate. The controller is configured to receive (for example from user input) or store a minimum value for flow rate that is acceptable to represent a normal operating range at or near the primary inlet(s) 73, or at the primary outlet 74, below which a low flow or failure of the external extraction source 100 is indicated. The controller 90 further receives one or more measured values of gas flow rate from the one or more flow meters, and determines whether a measured value falls below the minimum acceptable value. If the value is lower than the minimum acceptable value, the controller provides an alert, such as a failure signal to the user.

In a further implementation, one or more flow meters (where a flow meter is a type of sensor) may be located at or near the primary inlet(s) 73. The flow meters are configured to detect a flow direction. The controller is configured to receive a setting indicating backflow through the primary conduit 72, where backflow is opposite to the flow during normal operation, and where normal flow is flow from the primary inlet(s) 73 into the primary conduit 72. The controller is further configured to receive a setting value from the one or more flow meters, and determines whether a received setting value indicates low flow or failure of the external extraction source 100. If the controller determines backflow through one or more of the flow meters, which in turn signals low flow or failure of the external extraction source 100, the controller provides an alert, such as a failure signal, to the user.

The above approaches may be used as alternatives or in combination with one another.

In any of the above approaches, the controller 90 may further receive a predetermined duration over which the measured value may be outside of the normal operating range. If the controller determines that the predetermined duration has been exceeded, over which the measured value has continuously been outside of the normal operating range, or outside normal operation, the alert is issued. The alert may comprise a failure signal to cause termination of a build operation, whereby the controller 90 shuts down certain process components—for example, switching off one or more of the heat sources of the apparatus, switching off motion of the carriages, and thus terminating the build process of the object.

Therefore, there is provided a controller 90 for controlling the apparatus comprising the above described gas extraction system 70, configured to do at least one of the following:

(a1) receive a target value for one or more of flow rate, pressure and/or temperature, and optionally, a predetermined duration for each target value;

(b1) receive, from one or more sensors 92 of the apparatus 1, one or more corresponding measured flow rate, pressure and/or temperature values measured at one or more locations within the working space 4 and/or the secondary conduit(s) 76;

(c1) determine whether the measured value deviates from the corresponding target value; and (d1) if the measured value deviates from the target value over the respective predetermined duration, (i) determine, based on the target value, a corresponding control signal for at least one of the flow control devices 80, and (ii) provide the control signal to the at least one flow control device 80; or wherein the sensor 92 is one or more of a temperature sensor, a flow meter at or near the primary inlet(s) 73, and a flow meter at or near the primary outlet 74, and the controller 90 is configured to:

(a2) receive a threshold temperature value, and/or a threshold flow rate value, and/or a flow direction indicator setting for the flow meter, and optionally, a predetermined duration for each threshold value or flow direction indicator setting;

(b2) receive, from the one or more sensors 92, one or more of a measured flow rate, temperature and flow direction value;

(c2) determine that, for a time longer than the respective predetermined duration, one or more of the measured temperature values is above the threshold temperature value, and/or that the measured flow rate is below a threshold flow rate, and/or that the measured flow direction setting corresponds to backflow; and (d2) issue a failure signal to indicate a departure from normal operation of the apparatus if the measured temperature value is above the threshold temperature value, and/or if the measured flow rate value is below the threshold flow rate value, and/or if the measured flow direction setting indicates backflow for a time longer than the respective predetermined duration.

Thus the controller 90 may be configured to adjust, based on receiving data from the sensor 92, the flow rate of gas through the one or more secondary conduits 76 to as to control the temperature in the working space 4, and/or to determine whether the apparatus 1 is outside normal operating conditions and issue a failure signal, for example where the external source of extraction 100 has failed and hot gas is exiting through the primary inlet(s) 73 into the environment exterior to the working space.

In a preferred variant, the controller 90 is configured to receive a predetermined duration over which the measured temperature at the primary inlet(s) 73 may fall outside of a normal operating range, and once the respective predetermined duration has been exceeded, issue the failure signal.

The control signal may comprise an adjusted setting for the one or more of the flow control devices 80. The adjusted setting may correspond to a desired value or target value for a determined difference between the measured value and the target value and may be provided to the controller 90 in form of a look-up table. Where the target value is a temperature, the adjusted setting indirectly changes the measured value (i.e. temperature) by adjusting the flow rate, for example. Thus the control signal may be an adjusted flow rate setting that is provided to the one or more fan(s) or flow restrictor(s) within the gas extraction system 70 in order to achieve the temperature target of a measured temperature, as measured, for example, by a sensor 92 located in the working space 4. Instead, the control signal may be provided to the one or more fan(s) or flow restrictor(s) within the gas extraction system 70 in order to achieve the flow rate target. In this case the adjusted setting directly changes the measured value. Generally, the adjusted setting is chosen so as to achieve the target value of one of temperature, flow rate or pressure.

Figure 8A:
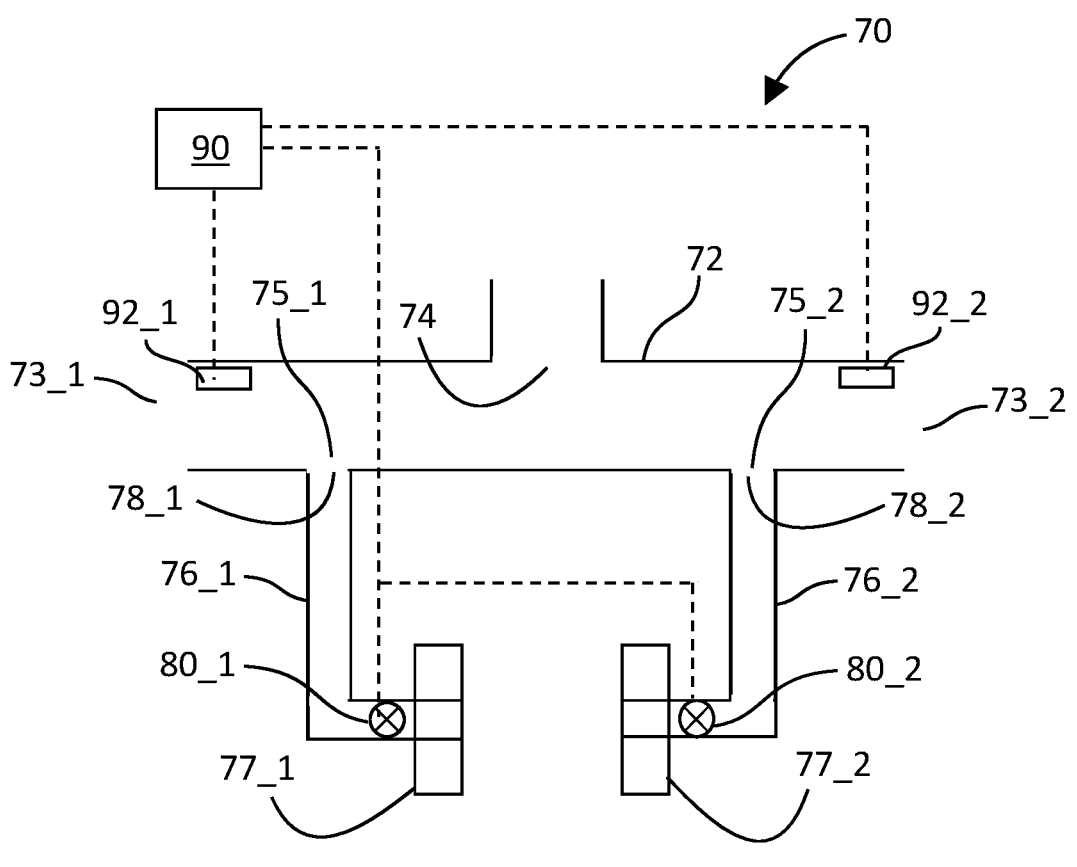
FIGS. 8A, 8B and 8C schematically illustrate details of the inlets of the secondary conduit.
Figure 9:
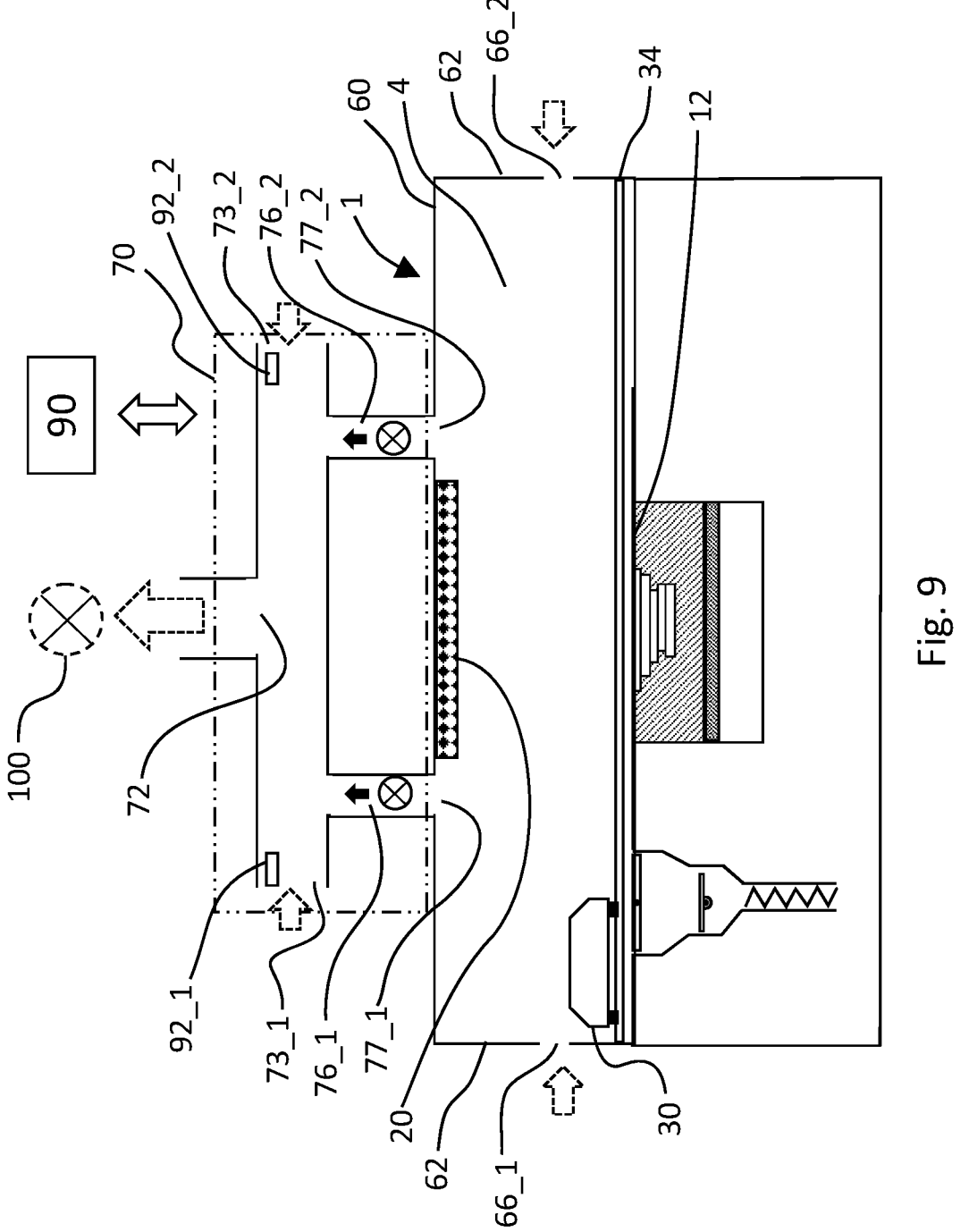
FIG. 9 is a schematic diagram of a cross-section through an apparatus for the layer-by-layer formation of three-dimensional objects by the consolidation of particulate material comprising the gas extraction system of FIG. 3A.

Referring now to FIG. 8A, optionally a particle filter may be fitted within the primary conduit 72, at a location between the secondary outlet 78 and the or each primary inlet 73 (for example a first filter at a location between secondary outlet 78_1 and primary inlet 73_1, and a second filter at a location between secondary outlet 78_2 and primary inlet 73_2).

Additionally, or instead, particle filters may be fitted in the secondary conduits. This may be beneficial in case of backflow and where the gas of the working space 4 comprises polluting particles or fumes. A particle filter will contribute to the flow resistance of the or each primary inlet 73 (or generally of the flow path it is located in), which will have to be taken into consideration when designing the gas extract system 70. The filter may be a scrubber for gas fumes. If a particle filter is present, a warning signal to indicate extract failure may be sufficient.

The failure signal may be generated in response to a temperature sensor or flow meter located at or near the primary inlet(s) 73 providing a temperature measurement or a flow meter value or setting to the controller 90 that exceeds a predefined threshold temperature, or falls below a predefined threshold flow rate. The predefined threshold temperature may for example be a temperature in the range of 40-60° C., for example 50° C. Alternatively, or in addition, a flow meter at or near the primary inlet(s) may indicate backflow as a result of detecting flow from the primary conduit out of the primary inlets, which is a reversal of flow direction that is opposite to the flow direction under normal operating conditions (i.e. from the primary inlet(s) into the primary conduit).

The failure signal may alternatively be generated in response to a flow meter measurement provided to the controller 90 by a flow meter located in the primary conduit outlet 74 that signals low flow or no flow into the primary conduit 72.

The controller may also be configured to receive a predefined margin value for one or more of a temperature, flow or pressure target or threshold. The predefined margin defines a margin within which the target or threshold remains fulfilled, and an action is not triggered by the controller such as to provide an adjusted control signal or to issue a failure signal.

The predefined margin may be defined by the user, or it may be dependent on the measurement accuracy of the sensor.

Without a filter present, it may be desirable to also, or instead, discontinue the build process of the object 2. Therefore, the failure signal may comprise a control signal for controlling process components within the working space 4 of the apparatus 1; for example, the failure signal may comprise a control signal that turns off power to the fans. The process components may comprise one or more carriages 30, one or more infrared lamps, and an overhead heater 20 located above the build bed surface 12, wherein the one or more infrared lamps are supported by one or more of the carriages 30, and wherein the carriages 30 are movable across the powder build bed surface 12, driven by carriage motion devices. Additionally, or instead, therefore, the power control signal may be configured to turn off power to one or more of the infrared lamps; the overhead heater 20; and the carriage motion devices, so as to stop the carriages 30 from moving across the build bed surface 12.

In some implementations of the apparatus, adjustable flow restrictors, including open/shut valves, may be located in the gas extraction system 70 to improve the safety of the apparatus 1 in the event of failure or low extraction rate of the external extraction source 100. For example, one or more flow restrictors arranged to shut off the primary inlets 73 may be located at or near the primary inlet(s) 73. Alternatively, or in addition, one or more flow restrictors arranged to shut off flow between the primary conduit 72 and the working space 4 may be located within the secondary conduit(s) 76, or at the secondary inlet(s) 77 or at the secondary outlet(s) 78. The failure signal may thus further, or instead, comprise a shut off control signal to the one or more flow adjusting devices located at or near the one or more of the primary inlet(s) 73, at or near the one or more secondary inlet(s) 77, at or near the outlet(s) 74, 78, or at or near the working space inlet(s) 66, such that the one or more flow adjusting devices move to a shut position to block the flow of gas so as to prevent the gas from backflowing through the primary inlet(s) 73 to the environment external to the working space 4.

In some implementations, a shut off device may be located upstream of the flow control device within the secondary conduit 76, for example near or at the secondary conduit inlet 77, that can cause the secondary conduit 76 to be blocked to gas flow. This will prevent the external extraction source 100 from extracting gas past the fan and out of the working space 4, leaving the working space 4 undisturbed. Additionally, or instead, the controller may thus be configured to control a shut off means located downstream of the flow control in the secondary conduit 76, so as to provide a shut off signal to the shut off means that causes the secondary conduit 76 to be blocked to gas flow. The shut off signal may be synchronized with a power control signal provided to the flow control device 80, where the flow control device is a fan, that causes the fan to stop extracting gas from the working space 4. The shut off means may be a baffle or a butterfly valve.

In some implementations, the use of adjustable flow restrictors in the secondary conduit(s) 76 as shown in FIGS. 5 and 7 may be beneficial since they may act both as a flow control device and a shut off/safety valve. In addition, the use of passive control devices such as flow restrictors as dynamic flow control devices in the secondary conduit(s) 76 may be beneficial since a failure of the external source of extraction 100 will not lead to hot gases from the working space 4 being extracted, as would be the case where an active device such as a fan is used.

In the following, details of the secondary inlet(s) 77 will be described with reference to FIGS. 8A to 8C. In FIG. 9, an apparatus 1 is illustrated that comprises the gas extraction system 70 according to the present disclosure, using the variant of FIG. 3A.

Figures 8B, 8C:
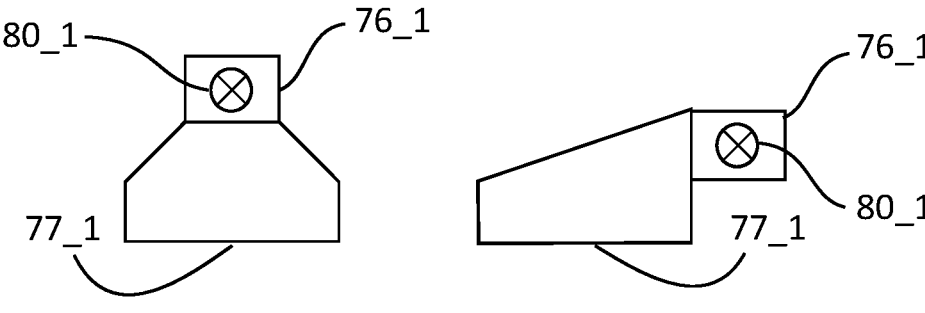

FIGS. 8A-8C and 9: Examples of the Gas Extraction System 70 and the Apparatus Using Sensors as Failure Indicators FIGS. 8A-8C schematically show details of an implementation of the gas extraction system 70 having two secondary conduits 76_1, 76_2, each having a respective elongate secondary inlet 77_1, 77_2. Each secondary conduit 76_1, 76_2 comprises a respective fan 80_1, 80_2, similar to the system in FIG. 3A. The primary inlets 73_1, 73_2 in this example are open and comprise temperature sensors 92_1, 92_2 connected to a controller 90. The fans 80_1, 80_2 are also connected to the controller 90, as indicated by the dashed lines. The elongate secondary inlets 77_1, 77_2 may be arranged to span the width of the build bed surface 12 below when the system 70 is fitted to the apparatus 1. Flow conditions into the secondary inlets 77_1, 77_2 may be improved by providing the inlet with a tapered shape such as the one shown in FIG. 8B or 8C, where the fan 80_1 (or 80_2) is located either directly above a symmetrical tapered inlet (FIG. 8B) or off to one side of a wedge-shaped inlet (FIG. 8C). Providing a uniform inflow of gas into the secondary inlets 77_1, 77_2 may be beneficial where certain flow conditions are to be set up along either side of the build bed surface 12. The controller 90 may be connected to and controlling the fans 80_1 and 80_2 so as to adjust the gas flow rate through the secondary conduits 76_1, 76_2 in response to temperature measurements made by the temperature sensors 92_1, 92_2.

FIG. 9 shows the gas extraction system 70 of FIG. 8 comprised within the apparatus 1. The apparatus has a working space 4 bounded by the working surface 13 comprising the build bed surface 12, side walls including two opposing side walls 62, and a ceiling 60. Two opposing side walls 62 facing along the direction of travel of carriage 30 each comprise a respective working space inlet 66_1, 66_2. The secondary inlets 77_1 and 77_2 are arranged above and to either side of the build bed surface 12, spanning the width of the build bed surface 12, in this case orthogonal to the direction of travel of the carriage 30. The elongation of the secondary inlets 77_1, 77_2 and the position of the working space inlets 66_1, 66_2 may be arranged such that a gas curtain is set up to either side of the build bed surface 12 that allows an improved temperature control of the build bed surface 12.

The design of the secondary inlets 77_1, 77_2, for example by providing tapers (e.g. as shown in FIGS. 8B and 8C) that enhance gas flow uniformity into the inlet along the direction of elongation, may provide additional benefits in uniformity of temperature control.

A controller 90 is connected to process components of the working space 4, such as to the motion control device (not shown) for carriage 30, and infrared lamps supported on the carriage, and to the overhead heater 20 located above the build bed surface 12. The primary inlets are shown to be provided with sensors 92_1 and 92_2 to monitor one or more of temperature, flow rate, pressure and flow direction at or near the primary inlets 73_1, 73_2. This illustrates a position of sensors that may be used to indicate a failure of or low flow at the external source of extraction 100. With the controller 90 connected to the sensors 92_1, 92_2 and to the flow control devices located in the secondary conduits (in analogy to FIG. 8 these might be fans 80), the controller 90 may be arranged to monitor and analyse measurements provided by the sensors 92_1, 92_2 and compare to them to values indicating normal operation. If the values deviate from those measured, the controller 90 may issue a failure signal. For example, if the external source of extraction 100 provides low or no flow, and the fans in the secondary conduits 76_1, 76_2 are still operating, a temperature value that is higher than a temperature indicating normal operation may be detected by at least one of the sensors 92_1, 92_2 at the primary inlets 73_1, 73_2. This indicates a backflow of hot gas from the primary conduit 72 out of the primary inlets 73_1, 73_2 and into the external environment. The measured values may deviate from the predetermined threshold value by a predefined margin. This margin may be a user defined percentage, or a be associated with the accuracy of the sensor measurement. As described above, the controller may further monitor a duration over which the measured value is continuously such that it represents an abnormal operation. Only once the monitored duration exceeds a predetermined duration, the controller issues a failure signal to alert the user to abnormal operation, and optionally to terminate a build operation (such termination being controlled by the controller).

By providing the above apparatus, methods and controller therefor, a controllable and adjustable flow of gas out of the working space 4 of the apparatus 1 may be achieved even when the apparatus is connected, via the gas extraction system, to the high suction of the site ventilation system.

General Considerations of the Apparatus

In any of the above variants, the working space 4 of the apparatus 1 may comprise one or more working space gas inlets 66, arranged in one of the bounding surfaces, that is/are dedicated to help define the gas flow profile through the working space 4 in cooperation with the secondary inlet(s) 77.

Furthermore, in the above variants, it will be appreciated that upon connection to the external extraction source 100, the flow extracted by the external extraction source 100 equals the combined flow into the primary conduit 72 from the one or more primary inlets 73 and from the one or more secondary outlets 78

The one or more flow control devices may generate an under pressure within the working space 4 of the apparatus 1 compared to the pressure outside of the working space 4. The pressure external to the working space 4 may be ambient pressure.

Optionally, the combined primary flow resistance between the primary inlets 73 and their respective closest interfacing portion may be lower than the combined flow resistance between the secondary inlets 77 and their respective secondary outlets 78.

Alternatively, or additionally, the flow resistance of the combined primary inlets to the primary outlet is lower than the flow resistance of the combined secondary inlets to the respective secondary outlets.

The secondary inlets 77 may be located in the ceiling; for example first and second secondary inlets 77_1, 77_2 may each be facing an area at or near opposite ends of the build bed surface 12.

Any of the gas extraction system 70 or the apparatus 1 may have one or more sensors. A sensor may for example be located at one or more of the primary outlet 74, a primary inlet 73, a secondary inlet 77, a secondary conduit 76, and within the working space 4. The sensor may be a temperature sensor, flow meter or pressure sensor. Different sensor types maybe present at different locations.

A particle filter may be fitted within the primary conduit, at a location between the secondary outlet 78 and the primary inlet 73 (for example a first filter at a location between secondary outlet 78_1 and primary inlet 73_1, and a second filter at a location between secondary outlet 78_2 and primary inlet 73_2 in FIG. 8). This may be beneficial in case of backflow and where the gas of the working space 4 comprises polluting particles or fumes. The particle filter will contribute to the flow resistance of the primary inlet(s) 73, which will have to be taken into consideration when designing the gas extract system 70.

This the apparatus may comprise a filter at or near the one or more primary inlets 73, or between the secondary inlet 77 and the respective primary inlet 73 to filter impurities from the gas extracted from the working space 4 in case of reversal of flow such that gas flows from the one or more secondary inlets 77 to the respective primary inlet 73.

The apparatus may further, or instead, comprise a controller 90 for controlling the one or more flow control devices 80 in response to one or more measurements of:

flow rate in at least one of the secondary conduit(s) 76, flow rate into the primary outlet 74, temperature measured at at least one of the primary inlet(s) 73, flow rate and/or flow direction measured at at least one of the primary inlet(s) 73, temperature measured at at least one of the secondary inlet(s), so as to control components of the apparatus 1 or so as to provide a warning signal if the measured value deviates from a respective target value. For example, the measured value might deviate by a predefined margin from the target value. The predefined margin may be a user defined margin, or a threshold associated with the measurement accuracy of the sensor.

Primary inlet is "open/unimpeded to inflowing gas flow" or "partially open/partially impeded": An adjustable flow restrictor or a shut off valve may be located within the primary conduit 72 and/or at the primary inlet(s) 73. Examples of arrangements are shown in FIGS. 5 to 7B. During normal operation of the printer, the primary inlet(s) 73 are either fully open such that, for example, the flow resistance between primary inlet 73 and primary outlet 74 is lower compared to the flow resistance between the secondary inlet 77 and secondary outlet 78. In some arrangements it may be beneficial to control the flow resistance between primary inlet 73 and primary outlet 74 with respect to the flow resistance between the secondary inlet 77 and secondary outlet 78; in this case an adjustable flow restrictor may be present at a suitable location in the primary conduit 72, between the primary inlet 73 and the secondary outlet 74/interfacing inlet 75 (or the primary outlet 74, if this located closer to the primary inlet 73 than the secondary outlet 78). During normal operation, the flow restrictor would allow gas to enter the primary inlet 73 at any time. Thus the primary inlet 73 is 'partially open' or 'partially unimpeded to inflowing gas'. Only during a failure/low flow of the external gas extraction system 70 may the adjustable restrictor 80_P shut off the primary inlet 73; this is to be treated as a special case to do with control of the gas extraction system 70 or the apparatus using the gas extraction system 70 in the case of non-normal operation.

Gas Extraction System as a Separate Part

The above variants describe the gas extraction system 70 and its operation with reference to the apparatus 1. The gas extraction system 70 may be provided as an integral part of the apparatus 1. Alternatively, the gas extraction system 70 may be provided as a separate part, for use in the apparatus 1. The gas extraction system 70 provided as a separate part may have the features, options and combinations of those of the gas extraction systems 70 disclosed above.

Therefore, a gas extraction system 70 is provided for use in an apparatus 1 for the layer-by-layer formation of three-dimensional objects having an enclosed working space 4 from which gas is to be extracted, wherein the gas extraction system 70 comprises:

a primary conduit 72 comprising at least a first primary inlet 73, at least a first interfacing inlet 75, and a primary outlet 74; and at least a first secondary conduit 76 comprising a respective first secondary inlet 77 and a respective first secondary outlet 78, the first secondary inlet 77 being for fluid communication with the working space 4 for extracting gas from the working space 4, and the first secondary outlet 78 being for fluidic communication with the first interfacing inlet 75 in a region between the first primary inlet 73 and the primary outlet 74;

wherein the or each primary inlet 73 is open to an environment external to the working space 4, and wherein the primary outlet 74 is connectable to an external extraction source 100; and wherein the gas extraction system 70 further comprises one or more flow control devices 80 for controlling the flow of gas from the first secondary conduit 76 to the primary outlet 74 of the primary conduit 72.

The gas extraction system 70, upon connection to an external extraction source 100, may be arranged such that the flow extracted by the external extraction source 100 equals the combined flow into the primary conduit 72 from the primary inlet(s) 73 and from the secondary outlet(s) 78.

The secondary conduit(s) 76 may comprise the first secondary conduit 76_1 and a second secondary conduit 76_2, the primary conduit may further comprise a second interfacing inlet, and the second secondary conduit 76_2 may comprise a respective second secondary inlet 77_2 for fluidic communication with the working space 4, and a respective second secondary outlet 78_2 in fluidic communication with the second interfacing inlet 75_2.

Alternatively, the secondary conduit(s) 76 may comprise the first secondary conduit 76_1 and a second secondary conduit 76_2, the second secondary conduit 76_2 comprising a respective second secondary inlet 77_2 for fluidic communication with the working space 4, and a respective second secondary outlet 78_2; and a confluent portion 79 may be provided having first and second ends, wherein the first secondary outlet 78_1 and the second secondary outlet 78_2 are in fluidic communication with the first end of the confluent portion 79 and arranged so as to combine the flows from the first and second secondary outlets 78_1, 78_2 into the confluent portion, and wherein the first interfacing inlet 75 is in fluidic communication with the second end of the confluent portion, so as to receive the combined flows from the confluent portion. At least one of the flow control devices may be located in the confluent portion. Optionally, for any of the gas extraction systems disclosed, at least one of the flow control device(s) 80 may be located in at least one of the secondary conduits 76. The flow control devices 80 may be positioned at suitable locations within the gas extraction system 70. For example, one of the flow control devices 80 may be located in the first secondary conduit 76_1, and another of the flow control devices 80 may be located in the second secondary conduit 76_2. In some of the variants of the gas extraction system 70, at least one of the flow control device(s) 80 may be an adjustable flow restrictor capable of altering the flow resistance between the first primary inlet 73 and the primary outlet 74. Alternatively, or in addition, at least one of the flow control device(s) 80 may be a fan for moving gas from a secondary inlet 77 to a respective secondary outlet 78.

For gas extraction systems comprising a fan, for example a fan which has or provides a constant flow rate or for which the flow rate cannot be accurately controlled, at least a further flow control device 80 may be provided in the form of an adjustable flow restrictor for restricting the flow of gas from a secondary conduit 76 into the primary conduit 72.

In the variants of the gas extraction system 70, the primary conduit 72 may have one or more primary inlets 73, and at least one of the inlets may be unimpeded to inflowing gas flow. Alternatively or additionally, one or more of the primary inlets 73 may be at least partially unimpeded to inflowing gas flow and be at least partially open to the environment external to the primary conduit 72. For example, one or more of the primary inlet(s) 73 may comprise an adjustable flow restrictor that may be used to control the inflowing gas into the primary inlet 73, or it may be used to shut off the primary inlet 73 in case of failure of the external source of extraction 100.

The, or a further, flow control device may be located between the first primary inlet 73 and the first interfacing inlet 75. The flow control device 80 may be an adjustable flow restrictor. The adjustable flow restrictor may, for example, be located at or near the first primary inlet 73, operable to restrict or shut off inflowing gas flow.

In the variants of the gas extraction system 70, the flow resistance of the combined primary inlet(s) 73_1, 73_2 to the primary outlet 74 may be lower than the flow resistance of the combined secondary inlet(s) 77_1, 77_2 to the respective secondary outlet(s) 78_1, 78_2.

The first and second secondary inlets 77_1, 77_2 may be arranged to be connected to respective openings in the ceiling of the working space 4.

The various implementations of the gas extraction system 70 may comprise a sensor at one or more location(s), such as at or near the primary outlet 74, at or near the primary inlet(s) 73, at or near the secondary inlet(s) 77, within the secondary conduit(s) 76. The sensor may be a temperature sensor, flow meter or pressure sensor. Different types of sensors may be present in the gas extraction system 70 at one or more locations.

Optionally, a particle filter may be located at or near the one or more primary inlet(s) 73, or at a suitable location between a secondary inlet 77 and the respective primary inlet 73, to filter impurities from the gas extracted from the working space 4.

The gas extraction system 70 may be adapted to flow gas extracted from the working space past the back of the overhead heater 20. Alternatively, the primary conduit may be arranged to as to be in thermal contact with the back of the overhead heater 20 since gas entering the primary inlet(s) 73 is cooler than the gas extracted from the working space. In this way, the gas suctioned by into the primary outlet by the external source of extraction may be used to carry away heat from the back of the overhead heater 20.

Finally, it may be understood that the diagrammatic representations of the gas extraction system 70 in the Figures are drawn with sharp corners and right angled turns for simplicity of representation. In any implementation of any of the arrangements depicted herein, features such as flanged elbows, circular arcs, flow turning vanes and any other suitable flow smoothing devices and configurations may be utilised at junctions and elsewhere as appropriate.

The invention claimed is:

1. A method for extracting gas from the working space of an apparatus for layer-by-layer formation of three-dimensional objects, wherein the working space comprises a ceiling and a floor and wherein the floor comprises a build bed surface, the method comprising:

(a) extracting gas from the working space via a first secondary conduit comprising a first secondary inlet and a first secondary outlet, and a second secondary conduit comprising a second secondary inlet and a second secondary outlet, wherein the first and second secondary inlets are arranged in the ceiling above and to either side of the build bed surface, the first and second secondary inlets each spanning the width of the build bed surface and receiving gas from the working space;

(b) moving the gas from the first and second secondary conduits either (i) directly into a primary conduit via the first and second secondary outlets to a first interfacing inlet and a second interfacing inlet of the primary conduit or (ii) indirectly into the primary conduit by flowing gas from the second secondary conduit into the first secondary conduit at an intermediate section of the first secondary conduit so that a combined flow of gas from the first and second secondary conduits flows from the intermediate section of the first secondary conduit into the primary conduit, wherein gas from the working space is only received by the primary conduit from the first and second secondary conduits;

(c) extracting the gas from a primary outlet of the primary conduit by operating an external extraction source connected to the primary outlet;

(d) suctioning, by operating the external extraction source, a flow of gas from an environment external to the working space into the primary conduit via a primary inlet of the primary conduit that is open to the environment external to the working space, such that the gas extracted from the primary conduit in step (c) is a mixture of gas extracted from the working space via the first and second interfacing inlets, or via the first interfacing inlet and gas suctioned from the external environment to the working space via the primary inlet; and (e) operating a first internal flow control device located in the first secondary conduit and a second internal flow control device located in the second secondary conduit, or an internal flow control device located in the intermediate section, to control the flow of gas through the first secondary conduit and/or the second secondary conduit, and (f) determining one of a temperature, a flow speed or a flow direction of the gas flow at the primary inlet; and (g) generating, based on determining that, for a predetermined duration, at least one of: the detected temperature is above a normal operating range, the detected flow speed is below a normal operating range, or the detected flow direction is out of the primary conduit, a failure signal to indicate insufficient extraction at (d) for normal operation of the apparatus.

2. The method of claim 1, wherein the internal flow control device(s) is/are fan(s), wherein (e) comprises determining that the detected temperature is above a normal operating range and indicates a backflow of gas exiting the primary inlet from the primary conduit, and wherein (g) further comprises terminating a build operation of the apparatus.

3. The method of claim 1, further comprising:

detecting a temperature or flow speed of the gas flow at the primary outlet;

determining that the temperature or flow speed at the primary outlet is outside a normal operating range for a predetermined duration; and generating a failure signal to indicate a departure from normal operation of the apparatus.

4. The method of claim 1, wherein the internal flow control device(s) is/are fan(s), and wherein (e) comprises operating the fan(s) to control the flow of gas through the first and second secondary conduits.

5. The method of claim 1, wherein the primary inlet comprises a first primary inlet and a second primary inlet open to the environment external to the working space, and (d) comprises suctioning the flow of gas from an environment external to the working space into the primary conduit via the first and second primary inlets, such that the gas extracted from the primary conduit in step (c) is a mixture of gas extracted from the working space via the first interfacing inlet and gas suctioned from the external environment to the working space via the primary inlet; and wherein a property of the gas flow is detected at the first primary inlet and/or the second primary inlet.

* * * * *